United States Patent
Saito

(10) Patent No.: US 7,327,539 B2
(45) Date of Patent: *Feb. 5, 2008

(54) CPP GIANT MAGNETORESISTIVE HEAD WITH LARGE-AREA METAL FILM PROVIDED BETWEEN SHIELD AND ELEMENT

(75) Inventor: Masamichi Saito, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 483 days.

This patent is subject to a terminal disclaimer.

(21) Appl. No.: 10/823,473

(22) Filed: Apr. 13, 2004

(65) Prior Publication Data

US 2004/0207959 A1  Oct. 21, 2004

(30) Foreign Application Priority Data

Apr. 18, 2003  (JP) .............................. 2003-114189
Feb. 24, 2004  (JP) .............................. 2004-047758

(51) Int. Cl.
*G11B 5/39* (2006.01)

(52) U.S. Cl. ............... 360/324.1; 360/321; 360/324.11

(58) Field of Classification Search ............. 360/324.1, 360/324.11, 319, 322, 324.2
See application file for complete search history.

(56) References Cited

U.S. PATENT DOCUMENTS

| | | | |
|---|---|---|---|
| 5,668,688 A * | 9/1997 | Dykes et al. ............. | 360/324.1 |
| 5,898,548 A * | 4/1999 | Dill et al. ................. | 360/324.2 |
| 6,023,395 A | 2/2000 | Dill et al. | |
| 6,052,263 A | 4/2000 | Gill | |
| 6,259,586 B1 | 7/2001 | Gill | |
| 6,330,136 B1 | 12/2001 | Wang et al. | |
| 6,501,626 B1 | 12/2002 | Gill | |
| 2002/0172840 A1 | 11/2002 | Terada et al. | |
| 2003/0184918 A1 * | 10/2003 | Lin et al. ..................... | 360/314 |

(Continued)

FOREIGN PATENT DOCUMENTS

EP  1 416 474 A2  5/2004

(Continued)

OTHER PUBLICATIONS

Search Report dated Jul. 21, 2004 for Great Britain Application GB0408133.7.

*Primary Examiner*—Craig A. Renner
(74) *Attorney, Agent, or Firm*—Brinks Hofer Gilson & Lione

(57) ABSTRACT

A CPP giant magnetoresistive (GMR) head includes lower and upper shield layers; and a GMR element disposed between the upper and lower shield layers and comprising a pinned magnetic layer, a free magnetic layer, and a nonmagnetic layer disposed between the pinned magnetic layer and the free magnetic layer. Nonmagnetic metal films are provided directly above the lower shield layer and below the upper shield layer making direct contact with and having larger areas than the pinned magnetic layer and the free magnetic layer, respectively. An antiferromagnetic layer is provided in the rear of the GMR element in the height direction, for pinning the magnetization direction of the pinned magnetic layer. Alternatively, the dimension of the pinned magnetic layer in the height direction is larger than the dimension in the track width direction so that the magnetization direction of the pinned magnetic layer is stabilized without using an antiferromagnetic layer.

13 Claims, 8 Drawing Sheets

U.S. PATENT DOCUMENTS

| | | | |
|---|---|---|---|
| 2003/0184919 A1* | 10/2003 | Lin et al. | 360/324.2 |
| 2004/0207960 A1* | 10/2004 | Saito et al. | 360/324.1 |
| 2004/0207962 A1* | 10/2004 | Saito et al. | 360/324.11 |

FOREIGN PATENT DOCUMENTS

| | | |
|---|---|---|
| JP | 2000-123325 | 4/2000 |
| JP | 2001-266313 | 9/2001 |
| JP | 2001-307307 | 11/2001 |
| JP | 2002-232040 | 8/2002 |
| JP | 2002-305338 | 10/2002 |
| JP | 2002-314168 | 10/2002 |
| JP | 2002-319112 | 10/2002 |

* cited by examiner

CPP GIANT MAGNETORESISTIVE HEAD WITH LARGE-AREA METAL FILM PROVIDED BETWEEN SHIELD AND ELEMENT

This application claims the benefit of priority to Japanese Patent Application Nos. 2003-114189 and 2004-047758, herein incorporated by reference.

BACKGROUND OF THE INVENTION

1. Field of the Invention

The present invention relates to a CPP (Current Perpendicular to the Plane) giant magnetoresistive head in which a sensing current flows in the thickness direction (perpendicularly to the film plane).

2. Description of the Related Art

Giant magnetoresistive (GMR) elements used for hard disk devices and magnetic sensors are roughly divided into a CIP (Current in the Plane) type in which a sensing current flows in parallel with the film plane of each of layers constituting an element, and a CPP (Current Perpendicular to the Plane) type in which a sensing current flows perpendicularly to the film plane of each of the layers constituting an element.

FIG. 8 is a longitudinal sectional view showing the structure of a CPP-GMR head using a conventional CPP-GMR element. A CPP-GMR head 100 comprises a lower shield layer 110 extending in the X direction shown in the drawing, a lower nonmagnetic metal film 120 formed on the lower shield layer 110 at its center in the X direction, and a free magnetic layer 131, a nonmagnetic metallic material layer 132, a pinned magnetic layer 133 including sublayers 133a, 133b, and 133c, an antiferromagnetic layer 134, and an upper nonmagnetic metal film 140, which are laminated on the lower nonmagnetic metal film 120. The CPP-GMR head 100 further comprises an upper shield layer 150 formed over the upper nonmagnetic metal film 140 to extend in the X direction, hard bias layers 163 formed in contact with parts of both sides of the free magnetic layer 131 and with both sides of the nonmagnetic layer 132, insulating layers 161 filling in the respective spaces between the hard bias layers 163 and the lower shield layers 110, and insulating layers 164 filling in the respective spaces between the hard bias layers 163 and the upper shield layer 150. Furthermore, bias underlying layers 162 are disposed between the hard bias layers 163 and the insulating layers 161.

In the CPP-GMR head having the above-described construction, the lower shield layer 110 and the upper shield layer 150 function as electrode films, and a current also flows through the lower shield layer 110 and the upper shield layer 150. As generally known, each of the lower shield layer 110 and the upper shield layer 150 comprises a soft magnetic material, for example, NiFe or the like. Therefore, when the current flows through the lower shield layer 110 and the upper shield layer 150, an AMR (anisotropic magnetoresistance) effect occurs to change the resistances of the lower shield layer 110 and the upper shield layer 150. The change in resistance becomes noise of the output of the head.

Particularly, with a high current density, there is the problem of increasing the noise due to the AMR effect. For example, in the example shown in the drawing, the current density is increased at the entrance of the sensing current (the contact portion between the lower shield layer 110 and the lower nonmagnetic metal film 120, and the contact portion between the upper shield layer 150 and the upper nonmagnetic metal film 140).

In order to decrease the noise due to the AMR effect, it is thought to use a shield material with a low AMR effect for forming the lower shield layer 110 and the upper shield layer 150. However, a sufficient magnetic shield effect cannot be obtained by using the shield material with a low AMR effect.

In the CPP-GMR head having the above-described construction, the sensing current also flows through the antiferromagnetic layer 134 comprising, for example, PtMn. The antiferromagnetic layer 134 has a resistivity of about 200 µΩ·cm which is significantly higher than those of the nonmagnetic metal films 120 and 140, the free magnetic layer 131, and the pinned magnetic layer 133. Also, the antiferromagnetic layer 134 must be thickly formed for maintaining antiferromagnetic characteristics. For example, when the distance between the upper and lower shields is about 600 Å, the thickness of the antiferromagnetic layer 134 is about 200 Å. When the thick antiferromagnetic layer 134 having high resistivity is provided, the antiferromagnetic layer 134 has high resistance and thus generates heat when the sensing current flows therethrough. Since the temperature of the whole of the head is increased by the generated heat (Joule heat), the reliability and high-frequency characteristics of the head deteriorate. Also, the thick antiferromagnetic layer 134 causes a difficulty in decreasing the shield distance between the upper and lower shield layers, thereby causing a disadvantage to increasing the recording density.

In a CIP-GMR head, only about 10 percent of a sensing current flows through an antiferromagnetic layer, and the sensing current never flows through shield layers, thereby causing none of the above problems.

SUMMARY OF THE INVENTION

Accordingly, it is an object of the present invention to provide a CPP giant magnetoresistive head capable of decreasing noise due to the AMR effect of a shield layer and Joule heat.

The present invention has been achieved in consideration of the fact that a large-area nonmagnetic metal thick film provided in a wide area can relieve the concentration of a sensing current in the interface between a shield layer and a nonmagnetic metal film, and the absence of the antiferromagnetic layer from the flowing region of the sensing current enables the nonmagnetic metal film to be thickly formed and thus prevents the heat generation from the antiferromagnetic layer even when the sensing current flows, thereby decreasing the element resistance and significantly decreasing the Joule heat generated during the operation of the head.

A CPP giant magnetoresistive head of the present invention comprises lower and upper shield layers with a predetermined shield distance therebetween, and a giant magnetoresistive element disposed between the upper and lower shield layers and comprising a pinned magnetic layer, a free magnetic layer and a nonmagnetic layer disposed between the pinned magnetic layer and the free magnetic layer, a current flowing perpendicularly to the film plane of the giant magnetoresistive element, wherein large-area nonmagnetic metal films are provided directly above the lower shield layer and directly below the upper shield layer to make direct contact with the pinned magnetic layer and the free magnetic layer, respectively, of the giant magnetoresistive element, the large-area nonmagnetic metal films having larger areas than those of the pinned magnetic layer and the free magnetic layer, respectively.

In order to sufficiently relieve the concentration of the sensing current, each of the lower and upper large-area nonmagnetic metal films is preferably formed to a thickness of ¼ or more of the shield distance. In this case, the giant magnetoresistive element is consequently formed to a thickness of ¾ or less of the shield distance. For example, when the shield distance is 480 Å to 800 Å, the thickness of each of the lower and upper large-area nonmagnetic metal films is preferably 60 Å to 300 Å.

A nonmagnetic metallic material used for forming the large-area nonmagnetic metal films preferably has lower resistivity than that of a shield material. For example, the nonmagnetic metallic material preferably contains at least one element of Au, Ag, Cu, Ru, Rh, Ir, Pd, Ni—Cr, (Ni—Fe)—Cr, and Cr. Particularly, when the nonmagnetic metallic material contains Cr, the Cr content preferably exceeds 20 atomic percent. Each of the large-area nonmagnetic metal films may be a single layer film or a laminated film.

The large-area nonmagnetic metal film formed directly above the lower shield layer may be used as a seed layer for the giant magnetoresistive element. When the large-area nonmagnetic metal film is used as the seed layer, the large-area nonmagnetic metal film is preferably made Ta/Cu, Ta/Ru/Cu, Ta/Cr, Ta/Ni—Cr, Ta/(Ni—Fe)—Cr, or Cr. When the material used for forming the large-area nonmagnetic metal film contains Cr, the Cr content preferably exceeds 20 atomic percent.

There are the conceivable forms below for pinning the magnetization direction of the pinned magnetic layer.

In a first form, preferably, the pinned magnetic layer extends to the rear of the free magnetic layer and the nonmagnetic layer in the height direction, and the dimension of the pinned magnetic layer in the height direction is larger than that in the track width direction. In this form, the magnetization direction of the pinned magnetic layer can be stabilized by using the shape anisotropy of the pinned magnetic layer. Therefore, an antiferromagnetic layer need not be provided for pinning the magnetization direction of the pinned magnetic layer. When the antiferromagnetic layer is not provided, the Joule head generated when the sensing current flows can be significantly decreased.

In a second form, the antiferromagnetic layer is preferably provided in the rear of the pinned magnetic layer in the height direction, for pinning the magnetization direction of the pinned magnetic layer.

In a third form, the pinned magnetic layer preferably extends in the track width direction beyond the free magnetic layer and the nonmagnetic layer, and the antiferromagnetic layers are preferably provided on both sides of the pinned magnetic layer in the track width direction, for pinning the magnetization direction of the pinned magnetic layer. In this case, when the pinned magnetic layer has a laminated ferrimagnetic structure comprising a first pinned magnetic layer, a nonmagnetic intermediate layer and a second pinned magnetic layer, only the first pinned magnetic layer extends in the track width direction so that the antiferromagnetic layers are provided on both sides of the first pinned magnetic layer in the track width direction.

In the second and third forms, the antiferromagnetic layer is provided outside the giant magnetoresistive element, and thus the sensing current does not flow into the antiferromagnetic layer even when the sensing current flows through the giant magnetoresistive element. Therefore, the antiferromagnetic layer does not generate heat to significantly decrease the Joule heat generated during the operation of the head. Also, the magnetization direction of the pinned magnetic layer can be strongly pinned by an exchange coupling magnetic field produced between the antiferromagnetic layer and the pinned magnetic layer.

In a fourth form, preferably, the giant magnetoresistive element does not include the antiferromagnetic layer, and the pinned magnetic layer comprises a magnetic material having a positive magnetostriction constant or a magnetic material having high coercive force, the end of the pinned magnetic layer being exposed at the surface facing the recording medium. In this case, the symmetry of two-dimensional isotropic stress applied to the pinned magnetic layer is broken to apply uniaxial tensile stress to the pinned magnetic layer in parallel with the height direction. This inverse magnetostrictive effect stabilizes the magnetization direction of the pinned magnetic layer in a direction parallel to the height direction. In this form, when the sensing current flows through the giant magnetoresistive element, the generated Joule heat can be significantly decreased.

Part or entirety of the second pinned magnetic layer comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $CO_2MnY$ (wherein Y is at least one element of Ge, Si, Sn, and Al).

Part of entirety of the free magnetic layer comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al).

Practically, in the CPP giant magnetoresistive head, hard bias layers are provided on both sides of the giant magnetoresistive element and between the large-area nonmagnetic metal films, and the respective spaces between the hard bias layers and the large-area nonmagnetic metal film are filled with insulating layers.

In the present invention, the large-area nonmagnetic metal films are provided directly above the lower shield layer and below the upper shield layer, respectively, and have a constant thickness and larger areas than those of the free magnetic layer and the pinned magnetic layer, respectively, and thus the concentration of the sensing current in the upper and lower shield layers can be relieved to decrease noise due to the AMR effect of the upper and lower shield layers.

Also, in the present invention, the antiferromagnetic layer is provided in the rear of the giant magnetoresistive element in the height direction, for pinning the magnetization direction of the pinned magnetic layer. Therefore, when the sensing current flows through the giant magnetoresistive element, the antiferromagnetic layer does not generate heat to decrease the generated Joule heat, thereby suppressing an increase in the element temperature and improving reliability. In another form of the present invention, the antiferromagnetic layer for pinning the magnetization direction of the pinned magnetic layer is not provided, and the magnetization direction of the pinned magnetic layer is stabilized by the shape anisotropy or inverse magnetostrictive effect of the pinned magnetic layer. In this form, the generated Joule heat can be decreased.

DESCRIPTION OF THE PREFERRED EMBODIMENTS

The present invention will be described below with reference to the drawings. In each of the drawings, the X direction corresponds to the track width direction, the Y direction corresponds to the direction of a leakage magnetic field from a recording medium, and the Z direction corresponds to the moving direction of the recording medium and the lamination direction of layers which constitute a giant magnetoresistive element.

Figure 1:
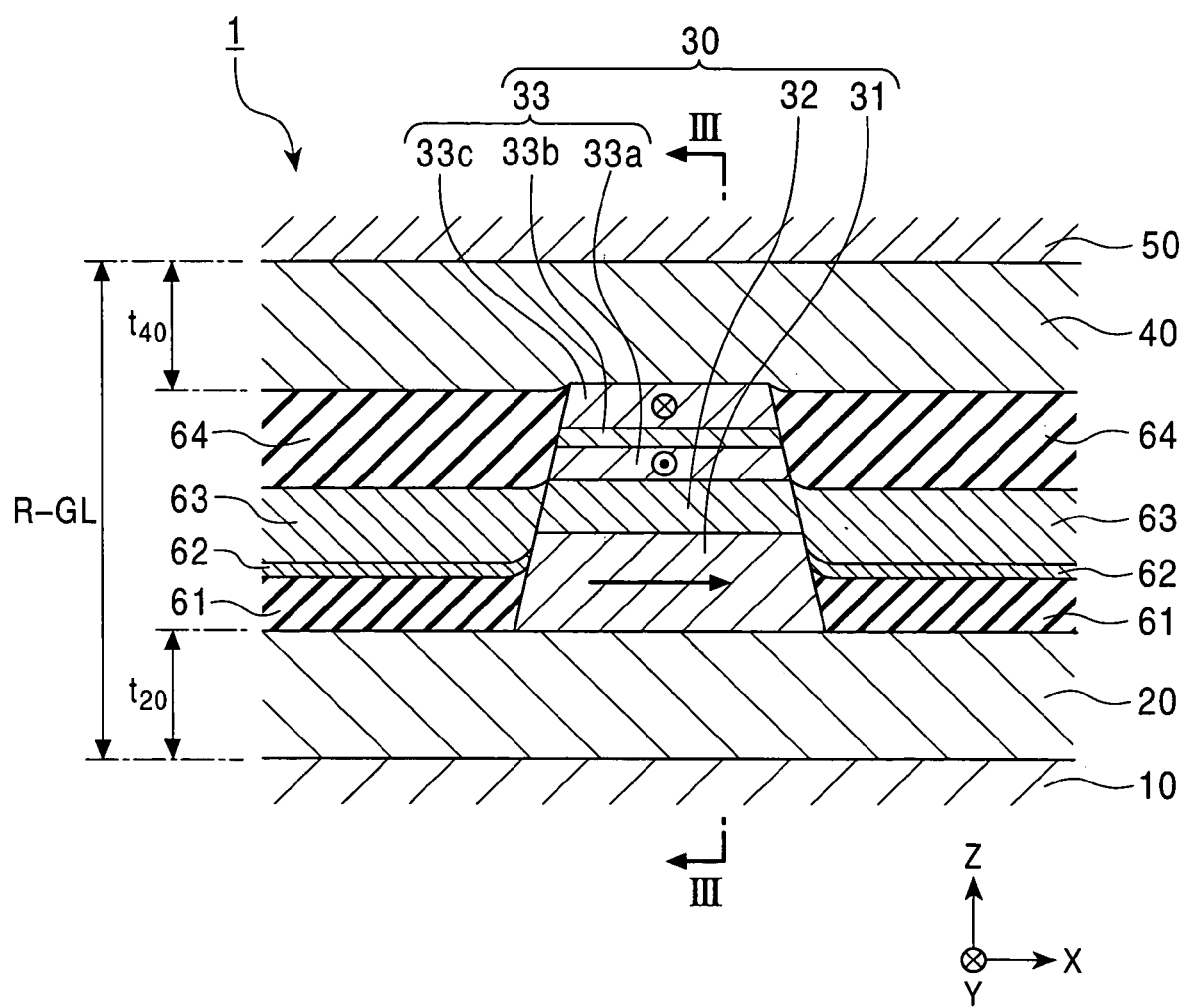
FIG. 1 is a partial sectional view showing the structure of a CPP giant magnetoresistive head (CPP-GMR head) according to a first embodiment of the present invention, as viewed from a surface facing a recording medium.
Figure 2:
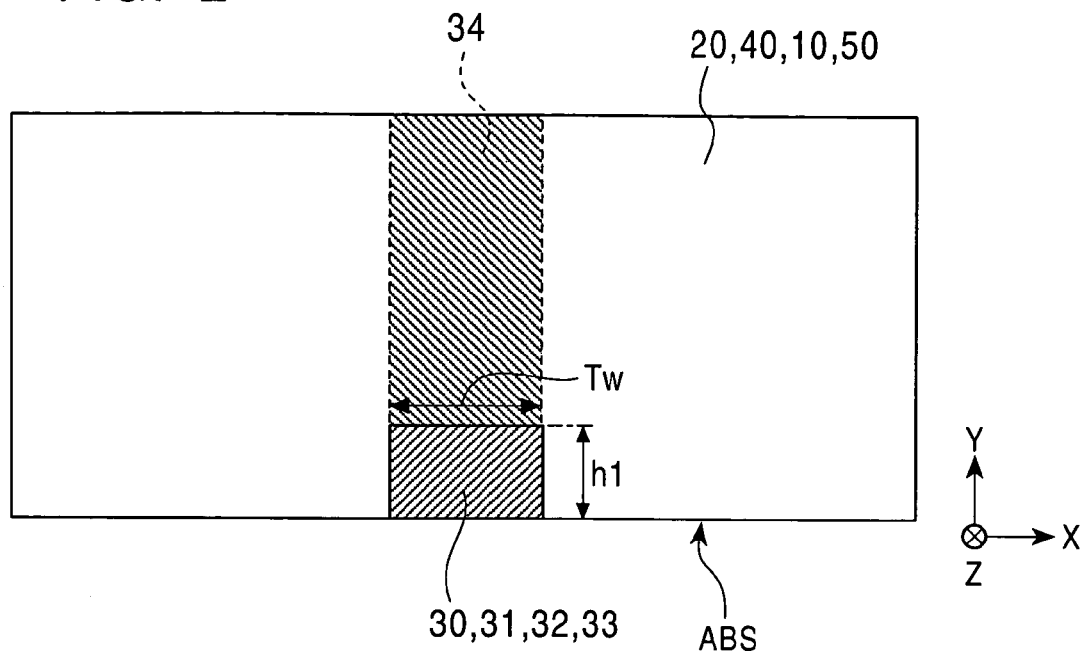
FIG. 2 is a schematic top plan view showing the GMR element shown in FIG. 1.
Figure 3:
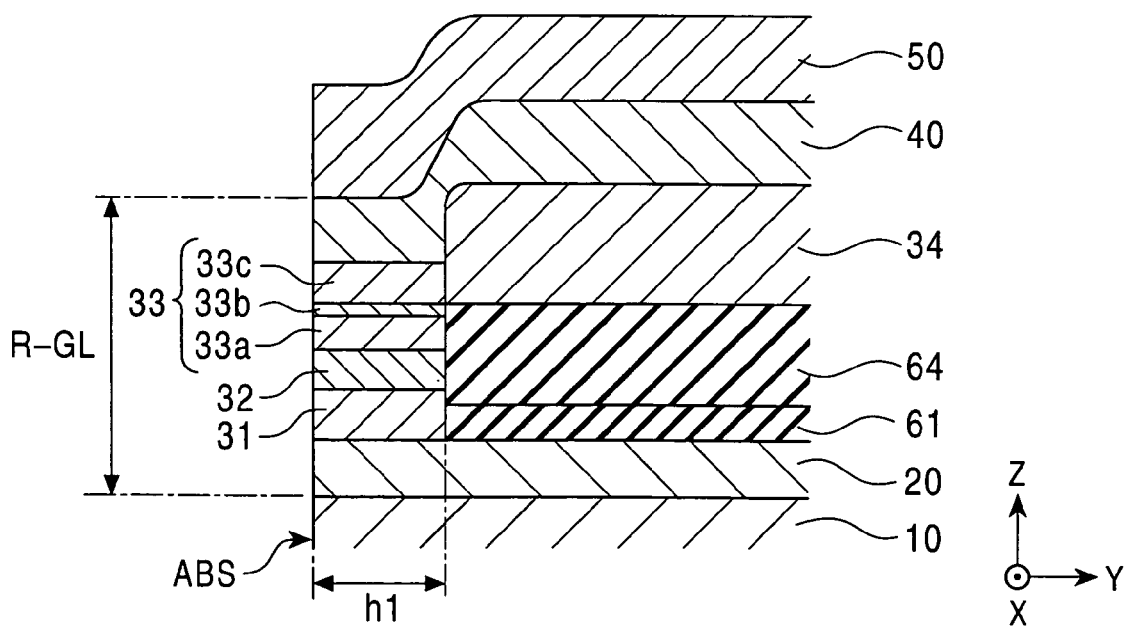
FIG. 3 is a partial sectional view of the structure of the CPP giant magnetoresistive head shown in FIG. 1, taken along a central line (line III-III in FIG. 1) of the element.

FIGS. 1 to 5 show a CPP giant magnetoresistive head (CPP-GMR head) according to a first embodiment of the present invention. FIG. 1 is a partial sectional view showing the structure of a CPP-GMR head 1, as viewed from the surface facing the recording medium, and FIG. 2 is a schematic top plan view of a GMR element 30, and FIG. 3 is a partial sectional view showing the structure of the CPP-GMR head 1, taken along a central line (line III-III in FIG. 1) of the element.

The CPP-GMR head 1 comprises lower and upper shield layers 10 and 50 with a predetermined shield distance R-GL therebetween in the Z direction shown in the drawing, a lower large-area nonmagnetic metal film 20, the GMR element 30 exhibiting a giant magnetoresistive effect, and an upper large-area nonmagnetic metal film 40, the lower and upper large-area nonmagnetic metal films 20 and 40 and the GMR element 30 being disposed between the lower and upper shield layers 10 and 50.

Each of the lower and upper shield layers 10 and 50 functions as a magnetic shield and an electrode, and is formed in a sufficiently wider area than that of the GMR element 30, as shown in FIGS. 1 to 3. Each of the lower and upper shield layers 10 and 50 is formed to a thickness of about 1 µm by using a soft magnetic material such as NiFe or the like for obtaining a sufficient magnetic shield effect.

The lower large-area nonmagnetic metal film 20 functions as a gap layer formed directly on the lower shield layer 10, and also functions as an electrode and a seed layer for regularly forming the GMR element 30. The upper large-area nonmagnetic metal film 40 functions as a gap layer disposed just below the upper shield layer 50, and also functions as an electrode together with the upper shield layer 50.

The lower large-area nonmagnetic metal film 20 and the upper large-area nonmagnetic metal film 40 are in direct contact with the lower surface (a free magnetic layer 31) and the upper surface (a first pinned magnetic layer 33c), respectively, of the GMR element 30. As shown in FIGS. 1 and 2, each of the lower and upper large-area nonmagnetic metal films 20 and 40 has an area which is sufficiently larger than that of the GMR element 30 and substantially the same as that of the lower shield layer 10 and the upper shield layer 50.

Each of the lower and upper large-area nonmagnetic metal films 20 and 40 comprises a nonmagnetic metallic material having lower resistivity than that of the lower and upper shield layers 10 and 50. For example, each of the lower and upper large-area nonmagnetic-metal films 20 and 40 preferably comprises at least one element of Au, Ag, Cu, Ru, Rh, Ir, Pd, Ni—Cr, (Ni—Fe)—Cr, and Cr. When the material contains Cr, the Cr content preferably exceeds 20 atomic percent. Each of the lower and upper large-area nonmagnetic metal films 20 and 40 may comprise a single film or a laminated film. The lower large-area nonmagnetic metal film 20 comprises, for example, any one of Ta/Cu, Ta/Ru/Cu, Ta/Cr, Ta/Ni—Cr, Ta/(Ni—Fe)—Cr, and Cr, for causing the lower large-area nonmagnetic metal film 20 to function as a seed layer of the GMR element 30. In this embodiment, the lower large-area nonmagnetic metal film 20 is formed in a Ta/Cr two-layer structure.

Each of the lower and upper large-area nonmagnetic metal films 20 and 40 is formed toga thickness of ¼ or more of the shield distance R-GL. For example, when the shield distance R-GL is 480 Å to 800 Å, the thickness t20 or t40 of each of the lower and upper large-area nonmagnetic metal films 20 and 40 is preferably 60 Å to 300 Å. Within this thickness range, the resistivity of the large-area nonmagnetic metal films 20 and 40 can be decreased to about ⅕ to 1/10 of that of NiFe used as a material for forming the shield layers 10 and 50. Namely, the sheet resistance of the large-area nonmagnetic metal films 20 and 40 each having a thickness of 60 Å to 300 Å corresponds to the sheet resistance of a NiFe film having a thickness of 300 Å to 3000 Å. Therefore, the sensing current easily flows through the large-area nonmagnetic metal films 20 and 40 to relieve the concentration of the sensing current in the interfaces between the large-area nonmagnetic metal films 20 and 40 and the shield layers 10 and 50. Consequently, a resistance change due to the AMR effect of the lower and upper shield layers 10 and 50 can be suppressed to a low level. The thickness t20 of the lower large-area nonmagnetic metal-film 20 may be the same as or different from that t40 of the upper large-area nonmagnetic metal film 40.

As shown in FIG. 1, the GMR element 30 is disposed at the substantially center of the shield layers 10 and 50 and the large-area nonmagnetic metal films 20 and 40 in the track width direction (the X direction shown in the drawing), and the GMR element 30 is sandwiched between the large-area nonmagnetic metal films 20 and 40 in the thickness direction. Since each of the large-area nonmagnetic metal films 20 and 40 is formed to a thickness of ¼ or more of the shield distance R-GL, the GMR element 30 is formed to a thickness of ¾ or less of the shield distance R-GL.

The GMR element 30 comprises the free magnetic layer 31, a nonmagnetic layer 32 and a pinned magnetic layer 33 which are laminated on the lower large-area nonmagnetic metal film 20 in that order from below. As shown in FIGS.

2 and 3, an antiferromagnetic layer 34 is provided in the rear of the GMR element 30 (strictly the free magnetic layer 31 and the nonmagnetic layer 32) in the height direction (the Y direction shown in the drawings), for pinning the magnetization direction of the pinned magnetic layer 33. The free magnetic layer 31, the nonmagnetic layer 32 and the pinned magnetic layer 33 have the same dimension (h1) in the height direction. The lower large-area nonmagnetic metal film 20, the free magnetic layer 31, the nonmagnetic layer 32, the pinned magnetic layer 33 and the upper large-area nonmagnetic metal film 40 are exposed at the surface (ABS) facing the recording medium, and the antiferromagnetic layer 34 is not exposed at the surface. In the GMR element 30, the pinned magnetic layer, the nonmagnetic layer and the free magnetic layer may be laminated in that order from below, which is opposite to the order in the embodiment shown in the drawings.

The pinned magnetic layer 33 has a laminated ferrimagnetic structure comprising a first pinned magnetic layer 33c and a second pinned magnetic layer 33a each comprising a magnetic material, and a nonmagnetic intermediate layer 33b disposed therebetween and comprising a nonmagnetic material.

The rear end of the first pinned magnetic layer 33c in the height direction (the Y direction) is in contact with the antiferromagnetic layer 34. The antiferromagnetic layer 34 produces an exchange coupling magnetic field between the antiferromagnetic layer 34 and the rear end of the first pinned magnetic layer 31c in the height direction. Consequently, the magnetization direction of the first pinned magnetic layer 33c is pinned in the height direction by the exchange coupling magnetic field. The first and second pinned magnetic layers 33c and 33a have magnetizations antiparallel to each other due to a RKKY interaction therebetween through the nonmagnetic intermediate layer 33b. Namely, the magnetization direction of the second pinned magnetic layer 33a is antiparallel to the height direction.

Each of the first and second pinned magnetic layers 33c and 33a partially or entirely comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $CO_2MnY$ (wherein Y is at least one element of Ge, Si, Sn, and Al). The thickness of each of the first and second pinned magnetic layers 33c and 33a is, for example, about 10 Å to 70 Å. The nonmagnetic intermediate layer 33b is formed to a thickness by using a material so as to produce the RKKY interaction between the first and second pinned magnetic layers 33c and 33a. In this embodiment, the nonmagnetic intermediate layer 33b is formed to a thickness of about 3 Å to 10 Å by using, for example, Ru. The pinned magnetic layer 33 may have a single-layer structure or a laminated structure comprising a magnetic film instead of the laminated ferrimagnetic structure.

The antiferromagnetic layer 34 preferably comprises an antiferromagnetic material containing Mn and element Z (element Z is at least one of Pt, Pd, Ir, Rh, Ru, and Os), or an antiferromagnetic material containing Mn and elements Z and Z' (element Z' is at least one element of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and the rare earth elements). Such an antiferromagnetic material has excellent corrosion resistance and a high blocking temperature, and produces a great exchange coupling magnetic field at the interface between the antiferromagnetic layer 34 and the first pinned magnetic layer 33c. The antiferromagnetic layer 34 is preferably formed to a thickness of 80 Å to 300 Å. In this embodiment, the thickness of the antiferromagnetic layer 34 is about 150 Å.

The nonmagnetic layer 32 preferably comprises a conductive material with low electric resistance, and in this embodiment, the nonmagnetic layer 32 comprises, for example, Cu. The nonmagnetic layer 32 is formed to a thickness of about 25 Å, for example. Part or entirety of the free magnetic layer 31 comprises Fe—Co—Cu (wherein Fe>10 atomic percent, Co >30atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al). The thickness of the free magnetic layer 31 is, for example, about 100 Å. Although the free magnetic layer 31 has a single-layer structure comprising a magnetic film, a laminated structure or laminated ferrimagnetic structure comprising magnetic films may be used. Furthermore hard bias layers 63 are in contact with both sides of the free magnetic layer 31 and the nonmagnetic layer 32, the hard bias layers 63 being magnetized in the track width direction. Also, a first or second insulating layer 61 or 64 with a thickness of several Å to several tens Å may be interposed between the GMR element 30 and each hard bias layer 63. The magnetization of the free magnetic layer 31 is aligned in the track width direction (the X direction) by a longitudinal bias magnetic field of each of the hard bias layers 63.

The first insulating layers 61, bias underlying layers 62, the hard bias layers 63, and the second insulating layers 64 are laminated in that order from below on both sides of the GMR element 30 in the track width direction, and disposed between the large-area nonmagnetic metal films 20 and 40.

The first and second insulating layers 61 and 64 comprise an insulating, material, for example, $Al_2O_3$, $SiO_2$, or the like, and formed to fill in the spaces between the hard bias layers 63 (and the hard bias underlying layers 62) and the large-area nonmagnetic metal film 20 and between the hard bias layers 63 and the large-area nonmagnetic metal film 40, respectively. Namely, the first insulating layers 61 are formed on the lower large-area nonmagnetic metal film 20 to have such a thickness that they contact parts of both sides of the free magnetic layer 31. The second insulating layers 64 are formed on the respective hard bias layers 63 to have such a thickness that they contact both sides of the pinned magnetic layer 33.

The bias underlying layers 62 are provided for improving the characteristics (coercive force Hc and remanence ratio S) of the hard bias layers 63 and increasing the bias magnetic fields produced from the hard bias layers 63. Each of the bias underlying layers 62 preferably comprises a metal film having a body-centered cubic structure (bcc structure). Specifically, each of the hard bias underlying layers 62 preferably comprises at least one element of Cr, W, Mo, V, Mn, Nb, and Ta. Although the bias underlying layers 62 are preferably formed only below the respective hard bias layers 63, they may be slightly interposed between both sides of the free magnetic layer 31 and the hard bias layers 63. The thickness of each of the hard bias underlying layers 62 formed between both sides of the free magnetic layer 31 and the hard bias layers 63 in the track width direction is preferably 1 nm or less. When the bias underlying layers 62 are interposed between the hard bias layers 63 and the free magnetic layer 31, the hard bias layers 63 can be magnetically connected to the free magnetic layer 31 to prevent a buckling phenomenon in which the ends of the free magnetic layer 31 are influenced by a demagnetizing field, thereby facilitating magnetic domain control of the free magnetic layer 31.

Figure 4:
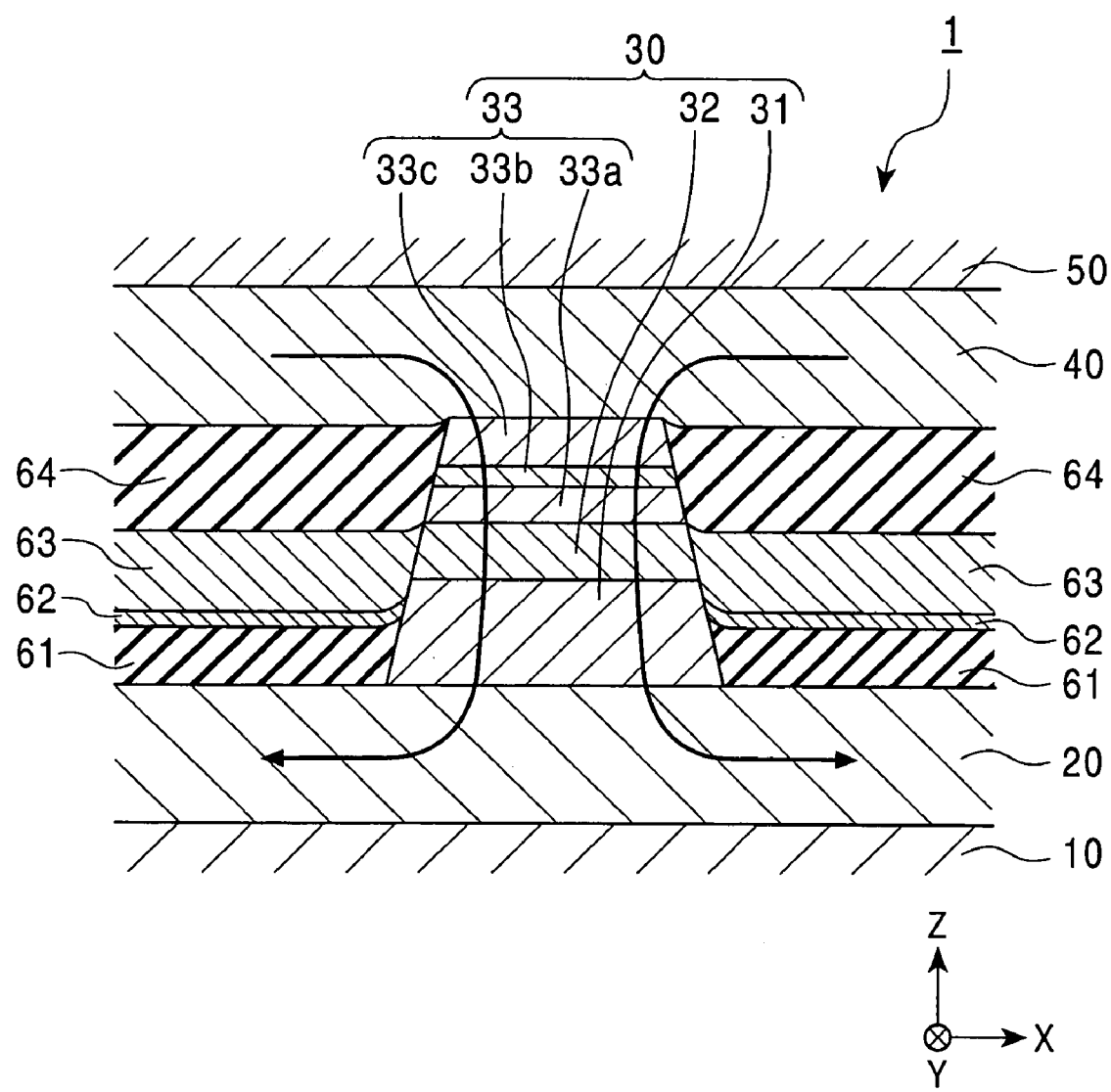
FIG. 4 is a conceptual view showing a current path produced by passing a sensing current from an upper shield layer to a lower shield layer.

In the CPP-GMR head 1 having the above-described whole structure, when the sensing current flows perpendicularly (in the thickness direction) to the film plane of the GMR element 30, a leakage magnetic field from the recording medium can be detected by using the giant magnetoresistive effect of the GMR element 30. In FIG. 4, an arrow shows a current path produced by passing the sensing current from the upper shield layer 50 to the lower shield layer 10.

As shown in FIG. 4, the sensing current supplied to the upper shield layer 50 mostly flows into the upper large-area nonmagnetic metal film 40 having lower resistivity than that of the upper shield layer 50. The sensing current flowing into the upper large-area nonmagnetic metal film 40 flows through the upper large-area nonmagnetic metal film 40 in parallel with the film plane because the upper large-area nonmagnetic metal film 40 is present in a wider area than that of the GMR element 30, and the sensing current flows from the interface between the upper large-area nonmagnetic metal film 40 and the pinned magnetic layer 33 to the GMR element 30 perpendicularly to the film plane (in the thickness direction). Then, the sensing current flows into the lower large-area nonmagnetic metal film 20 from the interface between the free magnetic layer 31 and the lower large-area nonmagnetic metal film 20. The sensing current flowing into the lower large-area nonmagnetic metal film 20 mostly flows through the lower large-area nonmagnetic metal film 20 with lower resistivity in parallel with the film plane because the lower large-area nonmagnetic metal film 20 has lower resistivity than that of the lower shield layer 10 and is present in a wider area than that of the GMR element 30. The sensing current little flows through the lower shield layer 10 disposed below the GMR element 30.

In this current path, the sensing current is not concentrated above or below the range in which the GMR element 30 is formed. Namely, the current density at each of the interfaces between the large-area nonmagnetic metal films 20 and 40 and the shield layers 10 and 50 is decreased, and even when the AMR effect of the shield layers 10 and 50 occurs, noise (resistance change of the shield layers 10 and 50) due to the AMR effect is thus suppressed. When the sensing current is passed from the lower shield layer 10 to the upper shied layer 50, the same current path as shown in FIG. 4 is formed except that the sensing current flows in the opposite direction.

As described above, the antiferromagnetic layer 34 is formed in the rear of the first pinned magnetic layer 33c in the height direction, for pinning the magnetization direction of the pinned magnetic layer 33 (the first pinned magnetic layer 33c), and thus the antiferromagnetic layer 34 is absent from the current path shown in FIG. 4. The antiferromagnetic layer 34 generally has significantly higher resistivity than those of the GMR element 30 and the large-area nonmagnetic metal films 20 and 40, and the antiferromagnetic layer 34 is formed to a thickness of as large as about 70 Å to 300 Å for obtaining antiferromagnetic characteristics, thereby producing great Joule heat when the current flows. Therefore, as in this embodiment, when the antiferromagnetic layer is absent from the current path, the antiferromagnetic layer does not generate heat even when the sensing current flows, and thus the temperature of the head is not excessively increased to improve reliability. Also, since the antiferromagnetic layer is absent from the current path, the high-frequency characteristics of the head are also improved.

Figure 8:
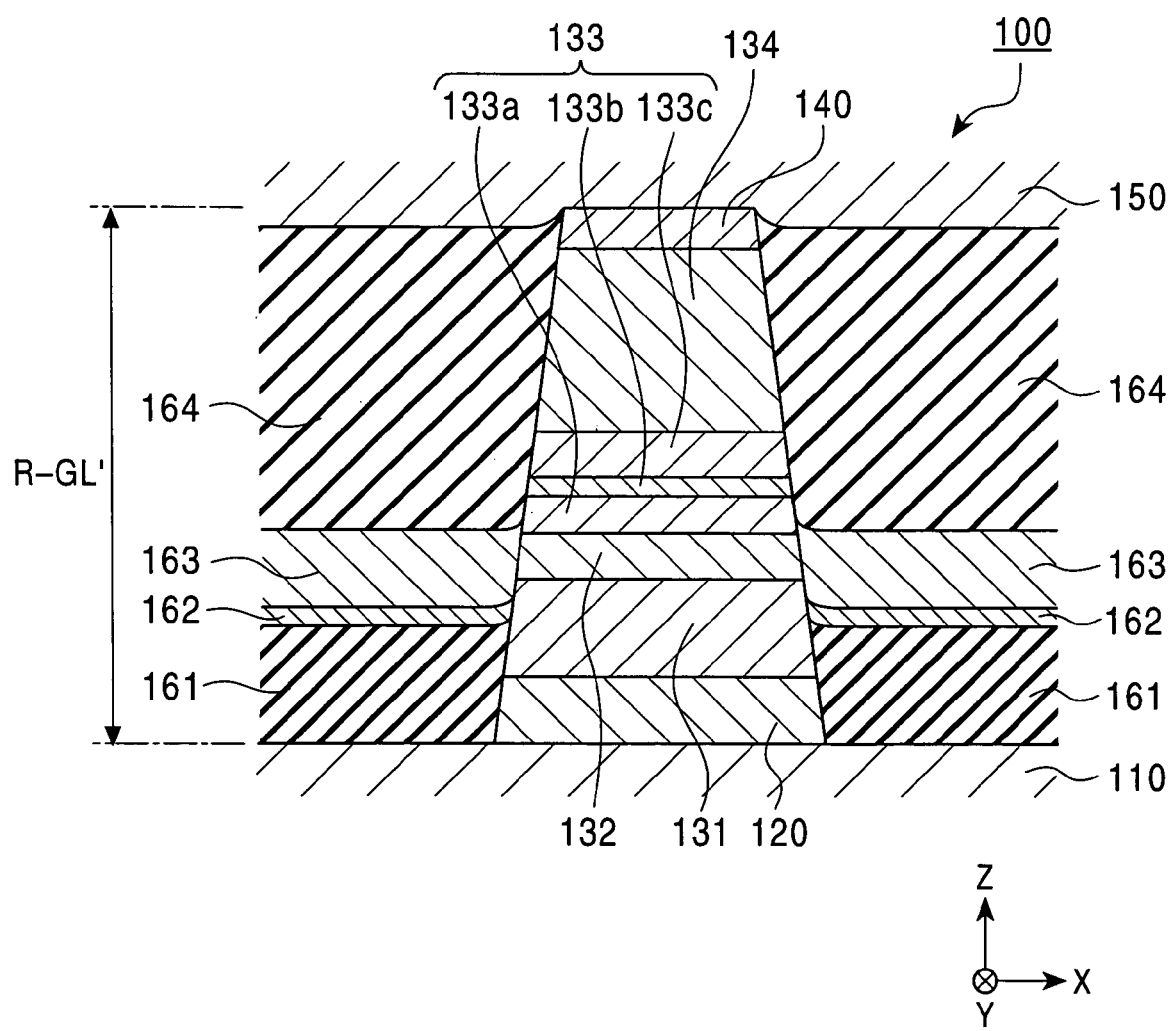
FIG. 8 is a longitudinal sectional view showing the structure of a conventional CPP giant magnetoresistive head, as viewed from a surface facing a recording medium.

In this embodiment, the antiferromagnetic layer is not provided in the current path, and thus the shield distance R-GL can be decreased, as compared with a conventional head. Furthermore, the upper and lower large-area nonmagnetic metal films 20 and 40 can be formed to larger thicknesses t20 and t40, respectively, as compared with a conventional head. As shown in FIG. 8, in the conventional head, the antiferromagnetic layer 134 is thickly formed directly on the pinned magnetic layer 133, and thus the thickness of the nonmagnetic metal film 120 cannot be sufficiently increased without increasing the shield distance R-GL'.

A method for manufacturing the CPP-GMR head 1 shown in FIG. 1 will be described below.

First, the lower shield layer 10, the lower large-area nonmagnetic metal film 20, the free magnetic layer 31, the nonmagnetic layer 32, the second pinned magnetic layer 33a, the nonmagnetic intermediate layer 33b, and the first pinned magnetic layer 33c are continuously deposited in a solid form in vacuum in that order from below. The material and thickness of each layer are the same as in the completed CPP-GMR head 1 shown in FIG. 1.

Next, a liftoff resist layer is formed on the first pinned magnetic layer 33c so as to cover an area substantially the same as or slightly smaller than the optical element area (track width dimension Tw and height dimension h1) of the GMR element 30 to be formed.

After the resist layer is formed, portions of the first pinned magnetic layer 33c, the nonmagnetic intermediate layer 33b, the second pinned magnetic layer 33a, the nonmagnetic layer 32, and the free magnetic layer 31, which are not covered with the resist layer, are removed by ion milling or the like. In this step, the GMR element 30 having a substantially trapezoidal shape and comprising layers ranging from the free magnetic layer 31 to the first pinned magnetic layer 33c is left at the substantially center of the lower large-area nonmagnetic metal film 20 in the track width direction. Since the substances removed by ion milling partially re-adhere to both sides of the GMR element 30, the re-adhering substances are preferably removed by milling again.

Then, with the resist layer remaining, the first insulating layers 61, the bias underlying layers 62, the hard bias layers 63 and the second insulating layers 64 are continuously deposited by sputtering on both sides of the GMR element 30. The material and thickness of each layer are the same as in the completed CPP-GMR head 1 shown in FIG. 1. In sputtering deposition, the angle of sputtered particles is preferably about 90 degrees with the lower large-area nonmagnetic metal film 20. After sputtering deposition, the resist layer is removed.

After the resist layer is removed, the antiferromagnetic layer 34 is formed in the rear of the first pinned magnetic layer 33c in the height direction, as shown in FIGS. 2 and 3. Namely, a resist layer having an aperture corresponding to an antiferromagnetic layer formation area is formed over the first pinned magnetic layer 33c and the second insulating layers 64. Then, a portion of the second insulating films 64, which is not covered with the resist layer, is removed by ion milling, and the antiferromagnetic layer 34 is formed in the removed portion. The material and thickness of the antiferromagnetic layer 34 are the same as in the completed CPP-GMR head 1 shown in FIG. 3. After the antiferromagnetic layer 34 is formed, the resist layer is removed.

Then, the GMR element 30 is annealed in a magnetic field in the height direction (the Y direction shown in the drawings) to produce an exchange coupling magnetic field between the antiferromagnetic layer 34 and the first pinned magnetic layer 33c. For example, the annealing temperature is about 270° C., and the magnitude of the applied magnetic field is about 800 kA/m. In the annealing in the magnetic field, the magnetization direction of the first pinned magnetic layer 33*c* is pinned in the height direction, and the magnetization direction of the second pinned magnetic layer 33*a* is pinned in antiparallel to the height direction.

Figure 5:
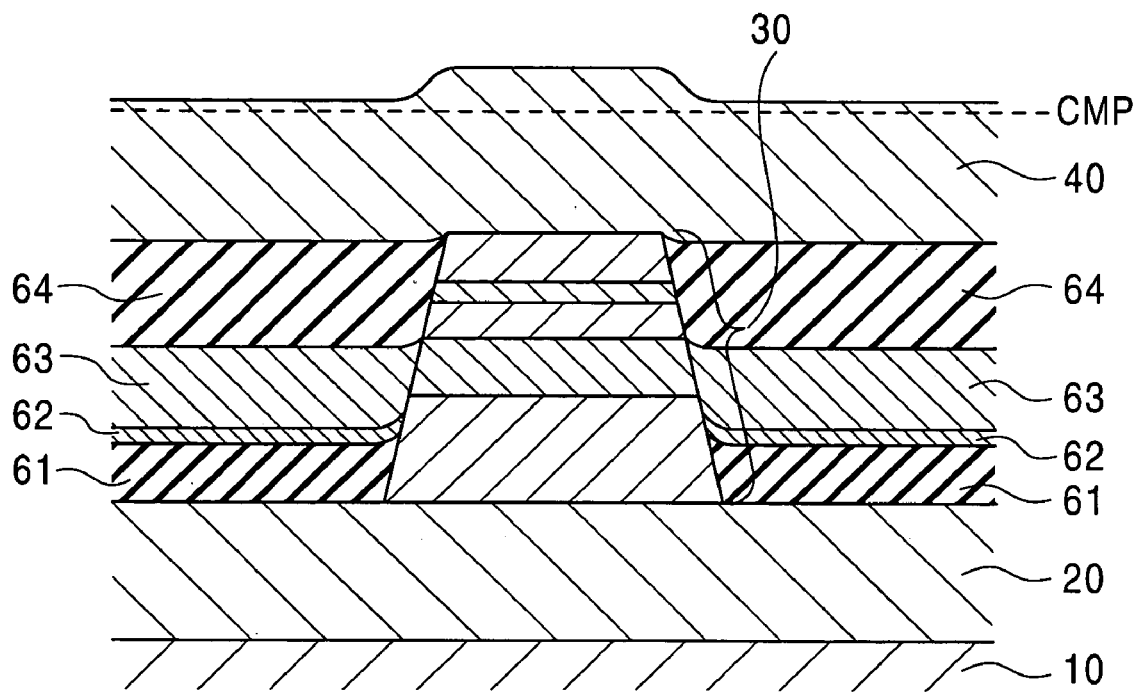
FIG. 5 is a longitudinal sectional view showing a step of a method for manufacturing the CPP giant magnetoresistive head shown in FIG. 1.
Figure 5:
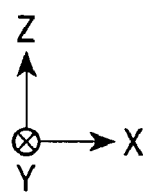

After the annealing, as shown in FIG. 5, the upper large-area nonmagnetic metal film 40 is deposited over the first pinned magnetic layer 33*c* and the second insulating layers 64 by sputtering, and the upper surface of the upper large-area nonmagnetic metal film 40 is subjected to CMP or ion milling. In the CMP or ion milling, the upper surface of the upper large-area nonmagnetic metal film 40 is planarized. The material of the upper large-area nonmagnetic metal film 40 and the thickness t40 after CMP are the same as in the completed CPP-GMR head 1 shown in FIG. 1.

Then, the upper shield layer 50 is deposited by sputtering on the planarized upper large-area nonmagnetic metal film 40. The material and thickness of the upper shield layer 50 are the same as in the completed CPP-GMR head 1 shown in FIG. 1. The upper shield layer 50 may be deposited by sputtering in succession to the upper large-area nonmagnetic metal film 40 during the deposition of the upper large-area nonmagnetic metal film 40.

The CPP-GMR head 1 shown in FIG. 1 is completed by the above-described steps.

In the above-described embodiment, the lower large-area nonmagnetic metal film 20 and the upper large-area nonmagnetic metal film 40 are provided directly above the lower shield layer 10 and below the upper shield layer 50 so that they are in direct contact with the free magnetic layer 31 and the pinned magnetic layer 33 (the first pinned magnetic layer 33*c*) and have a sufficiently larger area than the areas of the free magnetic layer 31 and the pinned magnetic layer 33, respectively. Therefore, the concentration of the sensing current in the lower shield layer 10 and the upper shield layer 50 can be relieved to decrease noise due to the AMR effect of the lower shield layer 10 and the upper shield layer 50.

In this embodiment, each of the lower large-area nonmagnetic metal film 20 and the upper large-area nonmagnetic metal film 40 is formed to a thickness of ¼ or more of the shield distance R-GL. Therefore, the sensing current easily flows through the lower large-area nonmagnetic metal film 20 and the upper large-area nonmagnetic metal film 40, and the sensing current little flows through the lower shield layer 10 and the upper shield layer 50. As a result, even when the AMR effect occurs in the lower shield layer 10 and the upper shield layer 50, noise due to the AMR effect can be suppressed.

Furthermore, in this embodiment, the antiferromagnetic layer 34 is provided in the rear of the first pinned magnetic layer 33*c* in the height direction, and is separated from the current path in which the sensing current flows. Therefore, even when the sensing current flows through the GMR element 30, the antiferromagnetic layer 34 does not generate heat to significantly decrease the heat generation from the GMR element 30, as compared with the conventional head shown in FIG. 8 in which the antiferromagnetic layer is present in the current path. As a result, an increase in the element temperature is suppressed to improve reliability. Also, the shield distance R-GL at the surface facing the recording medium can be decreased, as compared with the conventional head shown in FIG. 8. Thus, the degree of design freedom of the thicknesses of each layer of the GMR element 30 and the large-area nonmagnetic metal films 20 and 40 can also be increased.

In this embodiment, the antiferromagnetic layer 34 is provided in the rear of the pinned magnetic layer 33 in the height direction, for pinning the magnetization direction of the pinned magnetic layer 33 by an exchange coupling magnetic field produced in the interface between the antiferromagnetic layer 34 and the rear end surface of the first pinned magnetic layer 33*c* in the height direction. However, the magnetization direction of the pinned magnetic layer 33 may be pinned in various manners.

Figure 6:
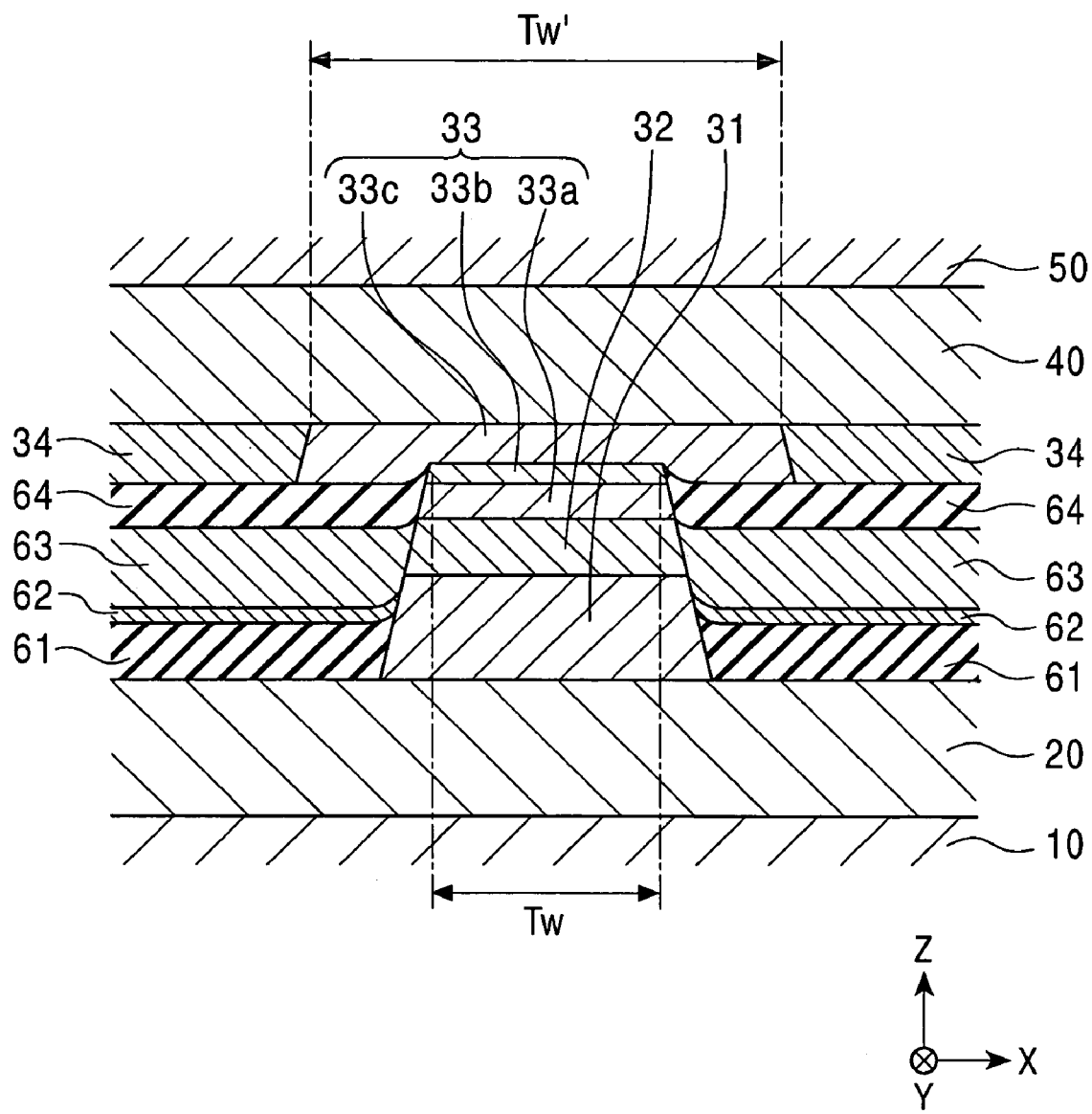
FIG. 6 is a longitudinal sectional view showing the structure of a CPP giant magnetoresistive head comprising an antiferromagnetic layer according to a second embodiment of the present invention, as viewed from a surface facing a recording medium.

For example, as shown in FIG. 6, the first pinned magnetic layer 33*c* may extend beyond the nonmagnetic intermediate layer 33*b*, the second pinned magnetic layer 33*a*, the nonmagnetic layer 32 and the free magnetic layer 31 in the track width direction so that the track width dimension Tw' of the first pinned magnetic layer 33*c* is larger than the track width dimension Tw of the GMR element 30. The antiferromagnetic layers 34 may be provided in contact with both sides of the extending first pinned magnetic layer 33*c*. When the pinned magnetic layer 33 does not have a ferrimagnetic structure, the whole of the pinned magnetic layer may sufficiently extend in the track width direction, and the antiferromagnetic layers may be provided in contact with both sides of the pinned magnetic layer.

Also, the pinned magnetic layer 33 may comprise a magnetic material having a positive magnetostriction constant or a magnetic material having high coercive force without using the antiferromagnetic layer, and the end of the pinned magnetic layer 33 may be exposed at the surface facing the recording medium. In this case, the symmetry of the two-dimensional isotropic stress applied to the pinned magnetic layer 33 is broken to apply uniaxial tensile stress to the pinned magnetic layer 33 in parallel with the height direction. This inverse magnetostrictive effect can stabilize the magnetization direction of the pinned magnetic layer 33 in a direction parallel to the height direction. In this case, a view of the head structure from the surface facing the recording medium is the same as the embodiment shown in FIG. 1, and the second insulating layer 64 is formed in the rear of the first pinned magnetic layer 33*c* in the height direction instead of the antiferromagnetic layer 34.

Figure 7A:
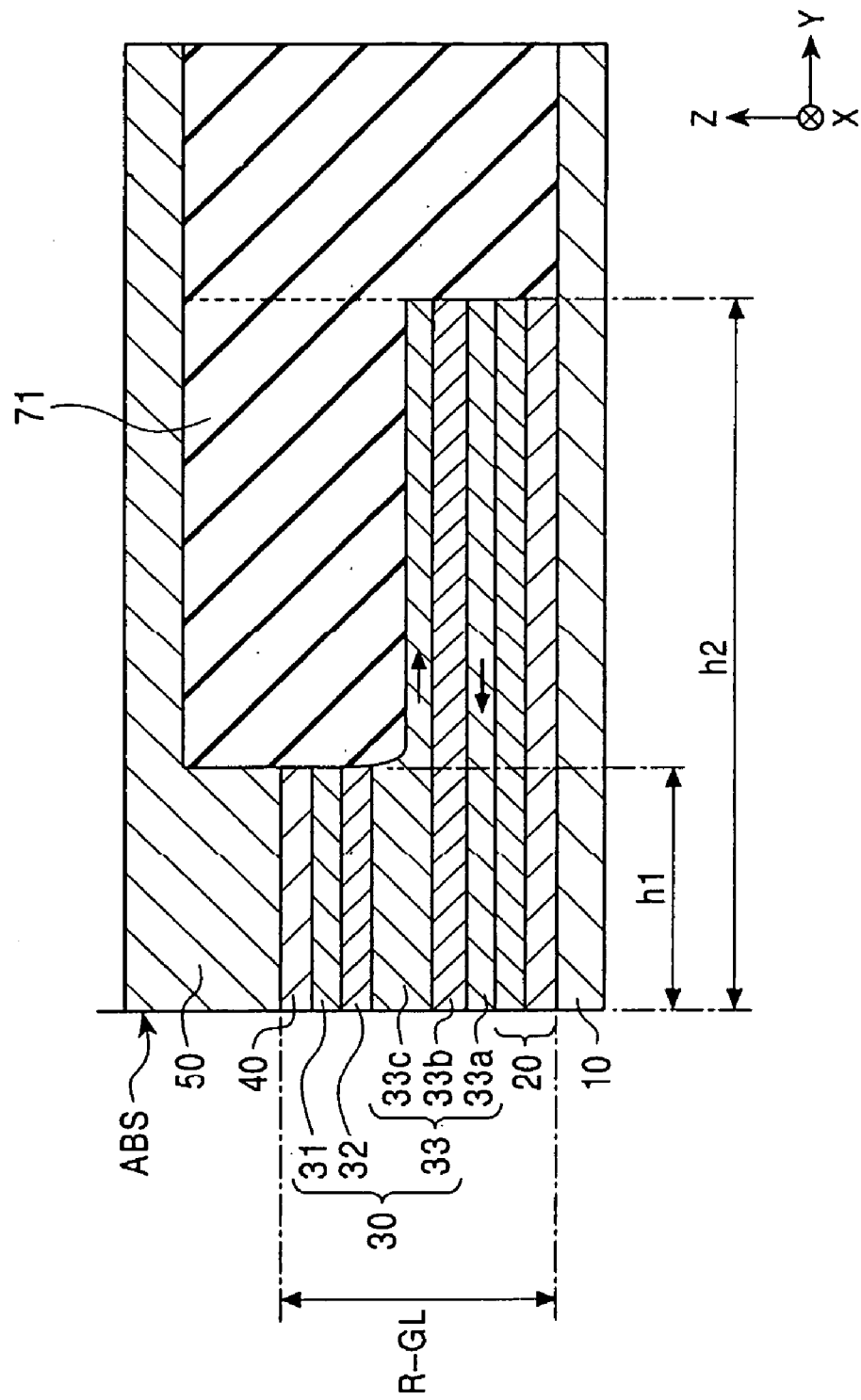
FIG. 7A is a partial sectional view showing the structure of a CPP giant magnetoresistive head comprising a pinned magnetic layer with a magnetization direction pinned according to a third embodiment of the present invention, taken along a central line of the element in parallel with the height direction.
Figure 7B:
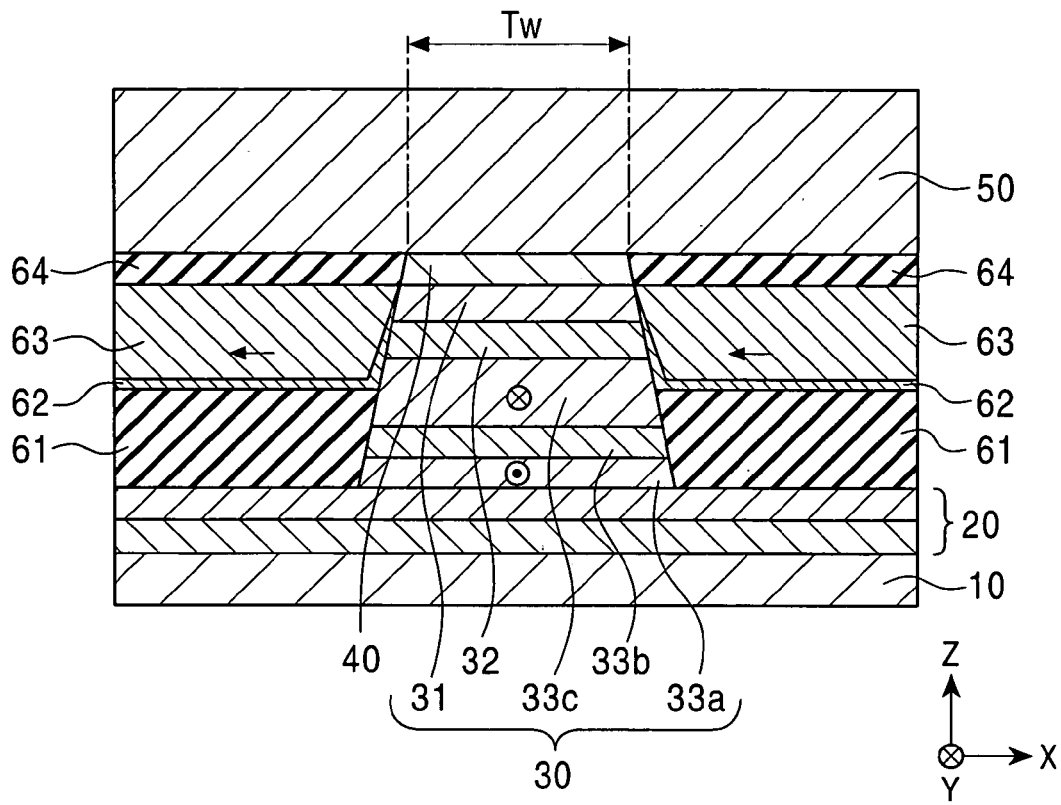
FIG. 7B is a partial section view from a surface facing a recording medium.
Figure 7C:
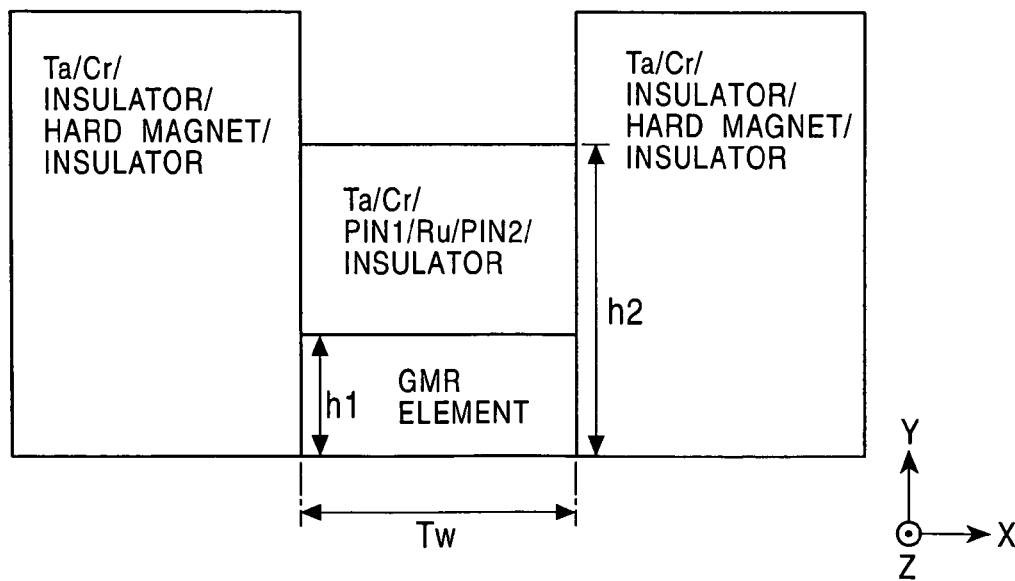
FIG. 7C is a schematic top plane view.

As shown in FIGS. 7A-7C, the antiferromagnetic layer is not provided, and the pinned magnetic layer 33 may extend to the rear of the free magnetic layer 31 and the nonmagnetic layer 32 in the height direction so that the dimension h2 of the pinned magnetic layer 33 in the height direction is larger than the dimension Tw in the track width direction (Tw<h2 and h1<h2). In this case, shape anisotropy occurs in the pinned magnetic layer 33 in the height direction, and thus the magnetization directions of the first and second pinned magnetic layers 33*c* and 33*a* can be stabilized by the shape anisotropy in a direction parallel to the height direction. Layer 71 shown in FIG. 7A is an insulator.

In this embodiment, the upper large-area nonmagnetic metal film 40 is formed over the GMR element 30 and the second insulating layers 64, and thus the upper large-area nonmagnetic metal film can be subjected to CMP to secure flatness. Therefore, the flatness can be secured even in laminating a recording inductive head on the upper shield layer 50.

The CPP-GMR head of the above embodiment can be applied not only to a reproducing thin film magnetic head but also to a recording thin film magnetic head comprising the reproducing thin film magnetic head and a recording inductive head laminated thereon.

What is claimed is:

1. A CPP giant magnetoresistive head comprising:
lower and upper shield layers with a predetermined shield distance therebetween; and
a giant magnetoresistive element disposed between the upper and lower shield layers and comprising a pinned magnetic layer, a free magnetic layer, and a nonmagnetic layer disposed between the pinned magnetic layer and the free magnetic layer, a current flowing perpendicularly to a film plane of the giant magnetoresistive element;
wherein a lower large-area nonmagnetic metal film is provided directly above the lower shield layer and an upper large-area nonmagnetic film is provided directly below the upper shield layer to make direct contact with the pinned magnetic layer and the free magnetic layer, respectively, of the giant magnetoresistive element, and the lower and upper large-area nonmagnetic metal films have larger areas than those of the pinned magnetic layer and the free magnetic layer, respectively.

2. The CPP giant magnetoresistive head according to claim 1, wherein each of the lower and upper large-area nonmagnetic metal films is formed to a thickness of ¼ or more of the shield distance, and the giant magnetoresistive element is formed to a thickness of ¾ or less of the shield distance.

3. The CPP giant magnetoresistive head according to claim 2, wherein the thickness of the lower and upper large-area nonmagnetic metal films is 60 Å to 300 Å.

4. The CPP giant magnetoresistive head according to claim 1, wherein a nonmagnetic metallic material used for forming the large-area nonmagnetic metal films contains at least one element of Au, Ag, Cu, Ru, Rh, Ir, Pd, Ni—Cr, (Ni—Fe)—Cr, and Cr, and when the nonmagnetic metallic material contains Cr, the Cr content exceeds 20 atomic percent.

5. The CPP giant magnetoresistive head according to claim 4, wherein a nonmagnetic metallic material for forming the large-area nonmagnetic metal film formed directly above the lower shield layer comprises Ta/Cu, Ta/Ru/Cu, Ta/Cr, Ta/Ni—Cr, Ta/(Ni—Fe)—Cr, or Cr, and when the nonmagnetic metallic material contains Cr, the Cr content exceeds 20 atomic percent.

6. The CPP giant magnetoresistive head according to claim 1, wherein the pinned magnetic layer extends to a rear of the free magnetic layer and the nonmagnetic layer in a height direction, and a dimension of the pinned magnetic layer in the height direction is larger than that in a track width dimension.

7. The CPP giant magnetoresistive head according to claim 1, further comprising an antiferromagnetic layer provided in a rear of the pinned magnetic layer in a height direction, for pinning a magnetization direction of the pinned magnetic layer.

8. The CPP giant magnetoresistive head according to claim 1, wherein the pinned magnetic layer extends in a track width direction beyond the free magnetic layer and the nonmagnetic layer, and the giant magnetoresistive element further comprises antiferromagnetic layers provided on both sides of the pinned magnetic layer in the track width direction, for pinning a magnetization direction of the pinned magnetic layer.

9. The CPP giant magnetoresistive head according to claim 1, wherein the pinned magnetic layer has a laminated ferrimagnetic structure comprising a first pinned magnetic layer, a nonmagnetic intermediate layer, and a second pinned magnetic layer, the first pinned magnetic layer extends in a track width direction, and the giant magnetoresistive element further comprises antiferromagnetic layers provided on both sides of the first pinned magnetic layer in the track width direction, for pinning a magnetization direction of the first pinned magnetic layer.

10. The CPP giant magnetoresistive head according to claim 1, wherein the giant magnetoresistive element does not include an antiferromagnetic layer, the pinned magnetic layer comprises a magnetic material having a positive magnetostriction constant or a magnetic material having high coercive force, and the pinned magnetic layer is exposed at a surface facing a recording medium.

11. The CPP giant magnetoresistive head according to claim 9, wherein part or entirety of the second pinned magnetic layer comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al).

12. The CPP giant magnetoresistive head according to claim 1, wherein part or entirety of the free magnetic layer comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al).

13. The CPP giant magnetoresistive head according to claim 1, further comprising hard bias layers provided on both sides of the giant magnetoresistive element and between the large-area nonmagnetic metal films, and an insulating layer filling in each space between the hard bias layers and the large-area nonmagnetic metal films.

* * * * *